June 19, 1923.
C. W. MANZEL
LUBRICATING SYSTEM
Filed Aug. 18, 1920
1,459,662
2 Sheets-Sheet 2
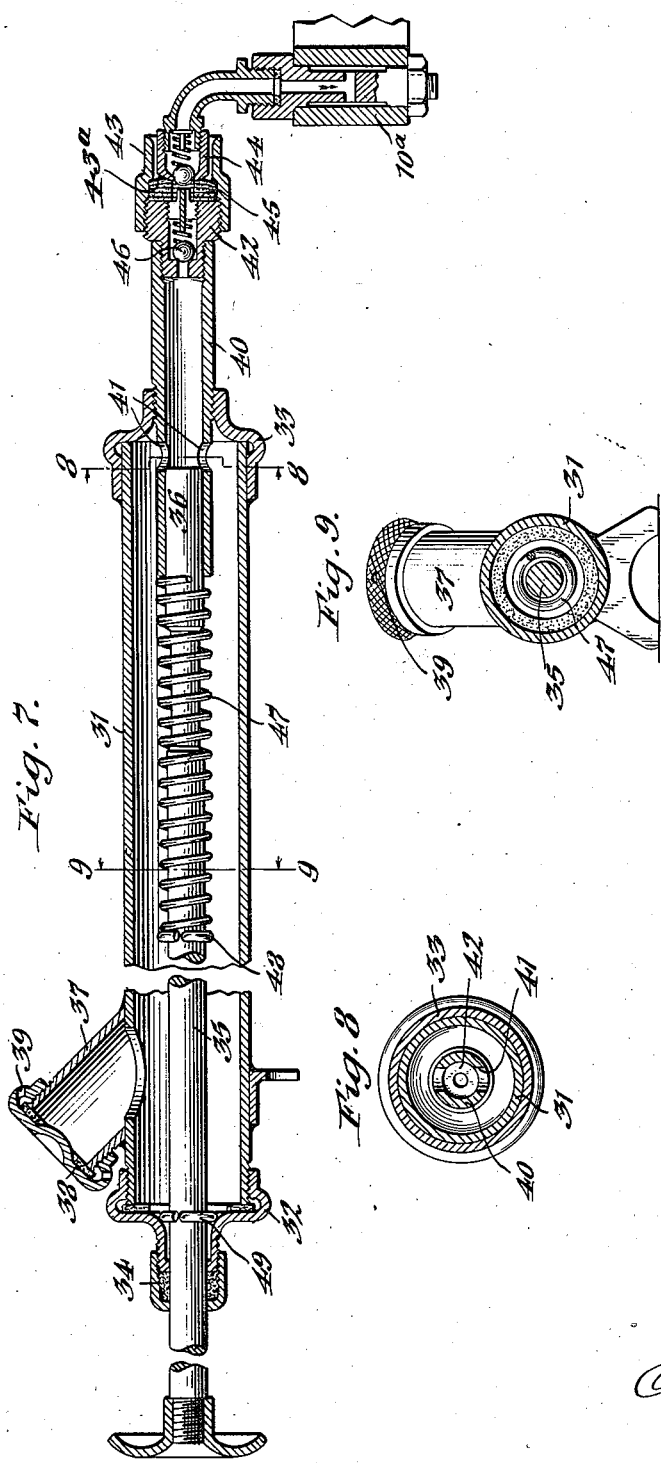

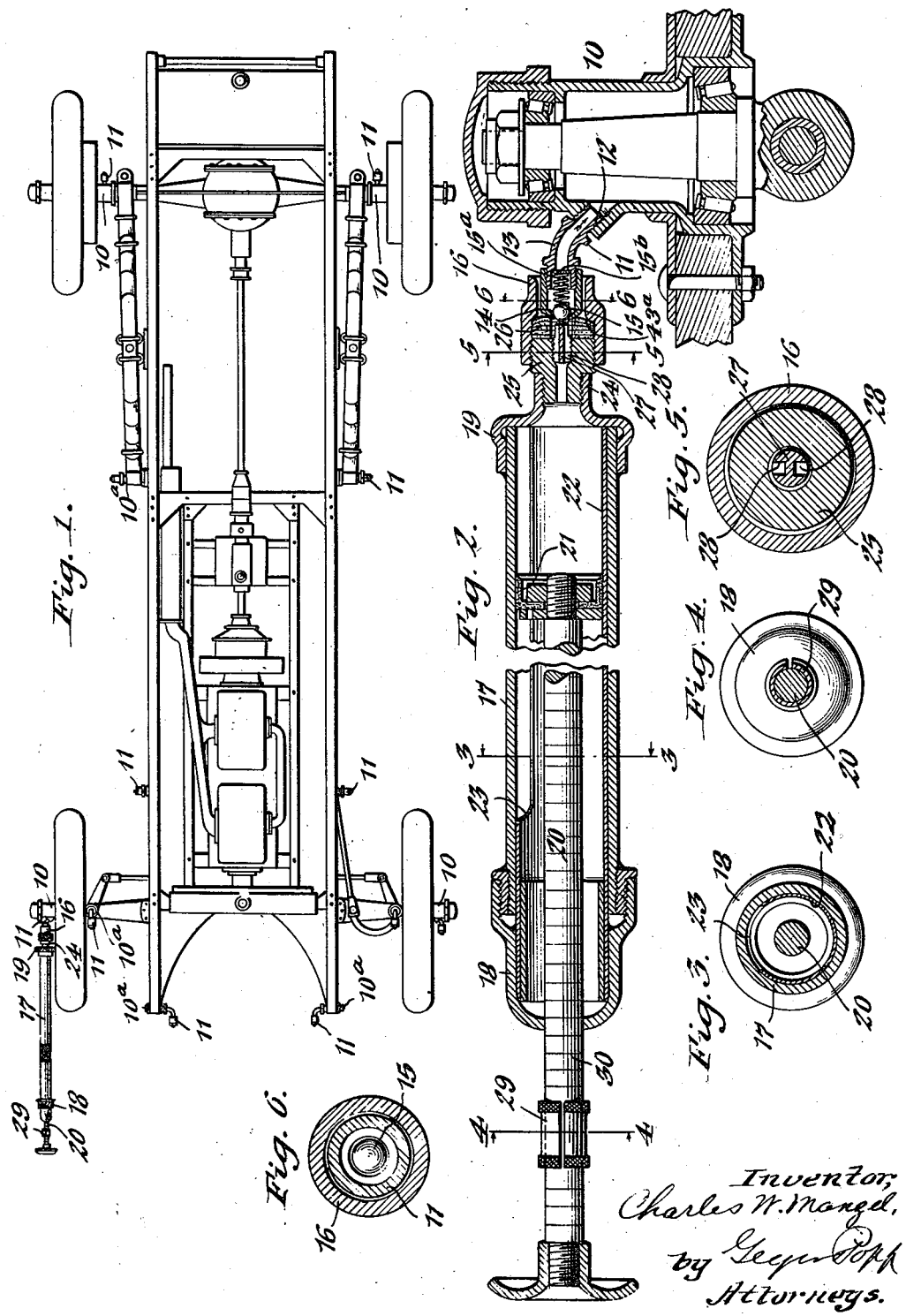

Patented June 19, 1923.

1,459,662

UNITED STATES PATENT OFFICE.

CHARLES W. MANZEL, OF BUFFALO, NEW YORK, ASSIGNOR TO THE BASSICK MANUFACTURING COMPANY, OF CHICAGO, ILLINOIS, A CORPORATION OF DELAWARE.

LUBRICATING SYSTEM.

Application filed August 18, 1920. Serial No. 404,300.

*To all whom it may concern:*

Be it known that I, CHARLES W. MANZEL, a citizen of the United States, residing at Buffalo, in the county of Erie and State of New York, have invented new and useful Improvements in Lubricating Systems, of which the following is a specification.

This invention relates to a lubricating system designed more particularly for supplying the various bearings of automobiles, motor-trucks, tractors and similar vehicles.

One of its objects is the provision of a lubricating system or apparatus by which oil or grease of any desired consistency can be fed to the parts requiring lubrication, under sufficient pressure to expel any remaining old oil or grease through the bearing joints and force in fresh lubricant, in order to insure thorough and positive lubrication of every bearing.

A further object is to permit quick and convenient lubrication of parts which are remote and ordinarily difficult of access, without the necessity of handling or touching them or going underneath the car, thus avoiding soiling of the hands and clothing.

It is recognized that grease is most efficient for ball and roller bearings, and oil for solid or ordinary bearings having no such anti-friction members; and my improved system contemplates the use of separate force pumps or guns for supplying the two kinds of lubricant, but a single combination gun capable of delivering either oiler or grease may be employed, if desired.

In the accompanying drawings: Figure 1 is a top plan view of an automobile equipped with the improved lubricating system, the body of the car being omitted. Figure 2 is a longitudinal section, on an enlarged scale, of a gun or force pump suitable for supplying grease to the bearings. Figures 3, 4, 5 and 6 are cross sections of said gun on the correspondingly numbered lines in Figure 2. Figure 7 is a longitudinal section of a gun or pump suitable for supplying oil to the bearings. Figures 8 and 9 are cross sections of this pump on the correspondingly-numbered lines in Fig. 7.

Similar characters of reference indicate corresponding parts throughout the several views.

Referring to Figs. 1–6, the old oil and grease cups of the various bearings 10, 10$^a$ of the motor car are replaced by feed-nipples 11, one of these bearings and its feed nipple being shown in vertical section in Fig. 2. This bearing is of the roller type and therefore lubricated with grease. It has the customary internally threaded connection 12 for receiving the feed nipple 11, which has a stem or neck 13 to which it is detachably connected by a screw threaded joint, as shown, or by other suitable means. This neck may be straight or curved, according to the location of the bearing, to render the nipple most accessible to the discharge nozzle of the oil or grease gun, as hereinafter more fully described. But in its preferred construction, this neck or stem 13 is flexible, so that it can be bent into any desired position or at the most convenient angle to facilitate access to it by the lubricant gun. For this purpose the nipple-neck may be constructed of a suitable flexible material, as annealed steel, which is flexible enough to permit such bending and yet stiff enough to remain in position and retain its form under the pressure ordinarily exerted against the nipple by the gun in lubricating the bearing. The nipple is thus universally adjustable, doing away with the necessity of furnishing straight nipples and a variety of elbow nipples of several angles and simplifying and cheapening their manufacture accordingly.

Each of these nipples is provided with a central inlet-orifice 14 which is normally closed by an internal check-valve 15, preferably a spring-pressed valve of the ball type, to retain the lubricant in the bearing and exclude dust and water therefrom. A suitable stop is provided to prevent this valve from being forced back in the bearing nipple by the lubricant far enough to close its throat. The stop shown in the drawings consists of a fixed pin 15$^a$ arranged axially in said neck and extending forwardly from a bridge piece 15$^b$ extending across its throat. The spring of the check valve surrounds this pin.

For supplying grease to bearings having such feed nipples, a comparatively long and slender gun or force pump is employed having a sliding piston and a tubular guide or centering nozzle 16 at its front end which is adapted to slip over the feed nipple and which is rigidly connected to the pump-body. This nozzle is controlled by and engaged with the nipple by the pump itself which serves as a long handle for this purpose, enabling remote bearings to be conveniently reached through any accessible space without the necessity of going or reaching under the car and soiling the hands and clothing. The preferred grease pump shown in the drawings comprises a long barrel 17 of relatively small diameter closed at its ends by caps or heads 18, 19, the rear one 18 being preferably a detachable screw cap through which passes the rod 20 of the pump piston or plunger 21. Arranged within the pump barrel and secured at its rear end to the screw cap 18 is a cylindrical, open-ended grease magazine or receptacle 22 extending practically throughout the length of the barrel and provided in its side with a filling slot or aperture 23 through which the magazine is filled with grease with a spoon or similar implement. To do this, the rear cap 18 is unscrewed from the pump barrel and the magazine is withdrawn therefrom. The plunger is then drawn back beyond the rear end of said filling aperture, and after filling the magazine, it is replaced and the cap is again secured in place.

Projecting centrally from the front head 19 of the pump-barrel is a hollow neck 24 with which engages the hollow stem of a discharge nipple 25. This nipple carries the guide-nozzle 16 of the pump which projects beyond said nipple, these parts being preferably united by screw threaded joints, as shown in Fig. 2. Housed within the guide nozzle and seated against the face of the pump nipple 25 is a packing washer or gasket 26 of rubber or other appropriate material, the bore of which registers with the bore of said nipple and which is adapted to seat against the head of any one of the feed-nipples 10. This packing preferably consists of a number of disks or laminations of oil proof material. The delivery end of the pump barrel and the receiving end of the bearing-nipple are provided with complementary means, whereby a sealed, lubricant-tight connection may be effected between said elements solely by the application of pressure lengthwise of the pump-barrel and without the use of means for positively coupling the pump to the nipple. The most satisfactory results are obtained when either the face of the packing gasket 26 or the receiving end of the nipple 25 is made convex, or when both of these parts have that contour, as shown in the drawings. By this construction, the central portion of the comparatively hard or rigid bearing nipple compresses the central portion of the yielding or less rigid packing gasket and temporarily changes its contour. Enlargement or spreading of the contact area between these parts is thus avoided, and such contact is confined to an area less than that of the pump-piston, thereby insuring the necessary preponderance of the longitudinal pressure on the pump, exerted by the operator, over the resistance or back-pressure tending to break the seal or joint between the pump and the bearing nipple. A perfect and reliable seal is maintained between these parts as long as such longitudinal pressure continues, thus effectually preventing leakage and waste of the lubricant through said joint, even though the oil or grease is forced into tight-fitting bearings at a pressure, for example, of 3000 pounds or more to the square inch, and notwithstanding the absence of a positive connection or coupling device between the gun and the feed nipple. At the same time, the pump is quickly separable from said nipple by simply relieving the forward pressure on the pump and withdrawing its guide nozzle from the nipple, thus rendering it unnecessary to reach under the car to apply or remove said nozzle directly by hand.

When the face of the yielding packing gasket is made convex, the desired central bulge is obtained by tightly clamping its rim between the front end of the gun-nipple 42 and an internal shoulder 43ª of the guide nozzle 43, as shown in Figs. 2 and 7. The guide nozzle preferably has a flared mouth and is fitted somewhat loosely on the bearing nipple, and as the face of the latter is convex, the nozzle is free to rock or swivel thereon to a limited extent, facilitating the engagement of the nozzle therewith.

To prevent undue constriction of the gasket-bore by the bearing nipple under the forward pressure of the pump or its plunger, a fixed core or stem 27 carried by the discharge-nipple 25, extends through said bore, as shown in Fig. 2. The projecting front portion of this core is reduced and provided throughout its length with longitudinal grooves or channels 28 for the passage of the grease into the bearing nipple.

In lubricating a bearing with this grease gun, after filling the magazine 22 and replacing it in the pump barrel, as hereinbefore described, the pump is joined to the bearing-nipple by passing its guide nozzle 14 over said nipple and the plunger is then pushed forward a greater or less distance, according to the amount of grease required by the bearing, some bearings requiring more than others. This pressure against the plunger handle is transmitted through the grease and the pump-body to the packing gasket, which is thereby firmly pressed against the end of the bearing-nipple, producing a tight and reliable seal, as before described. The pump-nozzle 14 serves not only to guide the end of the pump onto the bearing nipple, but also holds it against lateral displacement thereon.

To guide the user in lubricating the bearings, the plunger rod may be provided with an adjustable gage or stop 29 adapted to strike the rear cap of the pump barrel. The gage shown in the drawings consists of a split collar which tightly embraces the said rod and is held in place by friction. If desired, the plunger rod may be provided with a scale 30 with which the gage collar co-operates.

If a bearing-nipple should not extend in the proper direction or stand at the proper angle to conveniently receive the guide-nozzle of the pump, said nipple on account of its flexibility can be bent to the desired angle by means of said nozzle and the pump body, or by a separate tube of the proper length and size to reach and fit over the bearing-nipple.

It will now be understood that the connection 24 between the guide nozzle 16 and the pump-body is rigid and that the pump body itself forms an extended handle by which the nozzle is successively engaged with the several bearing-nipples of an automobile or other piece of mechanism. This renders it possible not only to quickly join the guide-nozzle to the bearing-nipple at a distance and without the necessity of reaching under the car and doing so directly with the hands, but it also enables pressure to be conveniently exerted by means of the plunger and the pump body in the longitudinal direction of said nozzle and nipple to insure a tight joint between them and effectually prevent leakage of the lubricant at that point. For this purpose said guide nozzle and the co-operating free end of the bearing-nipple are substantially parallel with the axis of the pump-body or in straight alinement therewith, as shown, the adjustable neck of the bearing nipple making it possible to use a long pump with a rigid nozzle for exerting such straight and direct pressure on the nipple to form a tight joint or seal.

By avoiding the direct handling of the co-operating joint members of the pump and the bearing, the lubricating operation is not only more convenient and cleaner, but an important saving of time is effected by reason of the absence of coupling devices and the use of a sliding or push-button, enabling a large number of such bearings to be quickly lubricated with ease.

Bearings which require oil rather than grease, can be quickly and conveniently lubricated in the same manner by the use of a force-pump adapted to deliver oil and having a similar discharge and guide-nozzle for receiving the nipples of such bearings. A pump suitable for this purpose is illustrated in Figs. 7-9. It comprises a long and slender oil cylinder or receptacle 31, similar to the barrel 17, closed at its ends by heads 32, 33, the rear head having a stuffing box 34 through which the rod 35 of the plunger 36 passes. The cylinder has a filling spout 37 closed by a cap containing a packing gasket 38. This cap is provided with vent openings 39 which admit air into the receptacle upon partly unscrewing the cap temporarily, to permit the pump to function properly. Arranged in the front portion of the oil cylinder is a longitudinal pump-barrel 40 in which the plunger 36 reciprocates and which is provided in its walls with oil inlet ports 41 communicating with said cylinder, oil being drawn through these ports on the suction or return stroke of the pump and the ports being closed by the plunger on its forward stroke to eject the oil. The barrel 40 extends through and beyond the front head 33 and terminates in a nipple 42 similar to the nipple 27. This nipple in turn carries a guide nozzle 43 like the nozzle 16, which fits over the feed nipple 44 of the bearing 10$^a$. This nipple is in all respects like the bearing nipple 13 of the roller-bearing 10 and forms a tight seal with the packing gasket 45 of said nozzle when the gun or the plunger is pushed toward it. In this case, the nipple 42 of the pump barrel contains a suitable check valve 46 to prevent the escape of oil from the pump when not engaged with a bearing nipple.

A spring 47 surrounding the plunger rod between the rear end of the pump barrel 36 and a stop collar 48 on the rod serves to effect the return-stroke of the plunger, while a similar collar 49 limits the rearward stroke of said rod by encountering the adjacent cap 32.

In lubricating a bearing with this oil gun, the operation is practically the same as with the grease gun, except that the latter is emptied by one full stroke of the piston, while in the oil gun the plunger may be operated numerous times before the oil receptacle 31 requires refilling.

The pumps preferably have a sufficient capacity to lubricate an automobile several times with one filling.

In both of these embodiments of the lubricating system the several bearings of an automobile, motor truck, tractor or other machine can be easily and quickly lubricated without going or reaching under the car and without touching or coupling the co-operating joint-members of the pump and the part to be lubricated, rendering the operation comparatively clean and protecting the clothing as well as avoiding soiling of the hands.

In using either of the pumps, after placing its guide nozzle over the bearing nipple, the joint is sealed and a charge of lubricant is delivered into the bearing by the single act of pushing the sliding plunger in the barrel, which furnishes the necessary pressure to form the oil-tight seal. This application of the gun-nozzle to the bearing nipple and the pushing in of the pump plunger can be done with one hand, enabling the gun to be used in restricted spaces or at points difficult of access where a gun requiring the use of both hands would be exceedingly inconvenient, if not impracticable. No couplings of any kind are employed to connect the pump to the bearing nipples and the pump can therefore be readily joined thereto as well as disconnected without the necessity of manipulating any coupling-parts and without movement of the pump barrel, except the straight forward thrust resulting from the pressure exerted against the piston rod to supply the lubricant, as hereinbefore described.

The co-operating surfaces of the guide nozzle and the bearing nipple are both uninterrupted and free from lugs or similar obstructions, and therefore permit the nozzle to be fully and freely slipped upon the nipple to obtain the necessary tight joint to prevent leakage under the relatively high pressure with which the lubricant is forced into the nipple.

Very satisfactory results have been obtained with a piston 6/16 of an inch in diameter and a discharge passage and gasket bore 3/16 of an inch in diameter, but I do not wish to be limited to these particular dimensions, as they may be varied without departing from the spirit of the invention as summed up in the appended claims.

I claim as my invention:

1. The combination with a nipple for feeding lubricant to a bearing, of means for supplying lubricant to said bearing-nipple under pressure, comprising a pump barrel adapted to bear with its delivery end against the receiving end of said bearing-nipple, a slidable piston reciprocating in said barrel and having an operating rod, a guide nozzle rigidly secured to the delivery end of said barrel in alinement therewith and adapted to loosely pass over said bearing-nipple, said guide nozzle and said bearing nipple being free from interlocking coupling members, whereby the nozzle may be slipped on and off the bearing nipple without restraint and the delivery end of the barrel joined to the receiving end of said bearing nipple by longitudinal pressure against said piston-rod.

2. The combination with a nipple for feeding lubricant to a bearing, of a force pump for delivering the lubricant into said nipple, and complementary means located at the receiving end of said nipple and the delivery end of said pump, whereby a sealed lubricant-tight connection capable of withstanding high pressure may be effected between said elements by the application of pressure lengthwise of the pump exerted toward said nipple from any one of a plurality of different directions.

3. The combination with a bearing-nipple having a convex receiving end, of means for supplying lubricant to said nipple under pressure, comprising a force pump provided at its delivery end with a yieldable packing-gasket having a lubricant-passage, said gasket having a convex face constructed to bear against the convex end of said nipple around the edge of the gasket-passage, thereby obtaining a reliable sealing relation between the last-mentioned parts.

4. In a lubricating system, a force-pump comprising a barrel, a sliding piston arranged therein, a guide-nozzle rigidly connected to the front end of said barrel, an apertured packing-gasket immovably arranged in said nozzle and adapted to seat against the end of a bearing-nipple, and means extending into the aperture of said gasket for resisting contraction thereof.

5. In a lubricating system, a force-pump comprising a barrel, a sliding piston arranged therein, a guide-nozzle rigidly connected to the front end of said barrel, an apertured packing-gasket immovably arranged in said nozzle and adapted to seat against the end of a bearing-nipple, and a rigid stem extending into the aperture of said gasket and having lubricant-channels.

6. The combination with a lubricant receptacle, of a compressor for supplying lubricant under pressure thereto comprising means for subjecting the lubricant to pressure by a manual force exerted upon said compressor toward said receptacle, and a rigid discharge conduit having means at its free end actuated by said force for making a sealed connection with said receptacle irrespective of the angle between said conduit and said receptacle.

7. The combination with a lubricant receptacle, of a compressor for supplying lubricant thereto, comprising a barrel having a rigid discharge conduit provided at its outer end with means for loosely receiving said lubricant receptacle and making a sealed connection therewith from various angles, a valve in said discharge conduit, and a piston operable by a manual force exerted toward said receptacle to place pressure upon the lubricant in said discharge conduit, said valve and connection-making means being actuated by the same force which actuates said piston.

8. A lubricating system comprising a receptacle for receiving lubricant, said receptacle tapering toward its outer end, a lubricant compressor having a rigid discharge conduit provided at its outer end with a coupling member rigidly secured thereto, comprising a guide nozzle for receiving said nipple, a gasket in said nozzle for contacting with said nipple, said nipple and gasket having communicating openings.

9. A lubricating system comprising a receptacle for receiving lubricant, said receptacle tapering toward its outer end, a lubricant compressor provided at one end with a coupling member, rigidly secured thereto, comprising a guide nozzle for loosely receiving said nipple, a gasket in said sleeve for contacting with said nipple, said nipple and gasket having communicating openings.

10. A lubricating system comprising a receptacle for receiving lubricant, said receptacle tapering toward its outer end, a lubricant compressor having a rigid discharge conduit provided at its outer end with a guide nozzle for receiving said nipple, a spring pressed valve normally closing said discharge conduit, and means for establishing a sealed contact between said guide nozzle and said nipple, and at the same time opening said valve by a manual pressure exerted on said compressor in a direction toward said nipple, the connection between said guide nozzle and said nipple being such as to permit the pressure on said compressor to be exerted toward said nipple from a plurality of different directions.

11. A lubricating system comprising a receptacle for receiving lubricant, said receptacle tapering toward its outer end, a lubricant compressor having a rigid discharge conduit provided at its outer end with a guide nozzle for loosely receiving said nipple, and means for establishing a sealed contact between said guide nozzle and said nipple, the connection between said guide nozzle and said nipple being such as to permit manual pressure on said compressor to be exerted toward said nipple from a plurality of different directions.

12. The combination with a lubricant receptacle, one end of which tapers outwardly, and a compressor for supplying lubricant to said receptacle, comprising means for making a sealed connection with said nipple by manual pressure exerted upon said compressor in any one of a plurality of different directions.

13. The combination with a bearing nipple of a pump for supplying lubricant under pressure thereto, said pump having a barrel provided with a rigid discharge conduit, a spring pressed valve in said discharge conduit, means connected with the free end of said discharge conduit for loosely receiving said bearing nipple and making a sealed joint therewith when manual pressure is exerted on said pump toward said bearing nipple from any one of a plurality of different directions, and means actuated by such pressure for exerting pressure on the lubricant, opening said valve, and maintaining said sealed joint.

14. The combination with a bearing nipple of a pump for supplying lubricant under pressure thereto, said pump having a barrel provided with a rigid discharge conduit, means connected with the free end of said discharge conduit for loosely receiving said bearing nipple and making a sealed joint therewith when manual pressure is exerted on said pump toward said bearing nipple from any one of a plurality of different directions, and means actuated by such pressure for exerting pressure on the lubricant.

15. The combination with a bearing nipple of a pump for supplying lubricant under pressure thereto, said pump having a barrel provided with a rigid discharge conduit, means connected with a free end of said discharge conduit for loosely receiving said bearing nipple and making a sealed joint therewith when manual pressure is exerted on said pump toward said bearing nipple from any one of a plurality of different directions, and means actuated by such pressure for maintaining said sealed joint.

16. The combination with a bearing nipple of a pump for supplying lubricant thereto, said pump having a barrel, a rigid discharge conduit extending from said barrel and provided at its free end with means for loosely receiving the end of said bearing nipple and making a sealed joint therewith from any one of a plurality of different directions, said pump comprising a piston actuated by manual pressure exerted toward and upon said bearing nipple for exerting pressure upon the lubricant in said barrel.

17. The combination with a bearing nipple, of a pump for supplying lubricant thereto, said pump having a barrel, a rigid discharge conduit extending from said barrel and provided at its free end with means for loosely receiving the end of said bearing nipple and making a sealed joint therewith from any one of a plurality of different directions when manual pressure is exerted upon said pump toward said receptacle.

CHARLES W. MANZEL.

DISCLAIMER.

1,459,662.—*Charles W. Manzel*, Buffalo, N. Y. LUBRICATING SYSTEM. Patent dated June 19, 1923. Disclaimer filed May 21, 1928, by the assignee, *The Bassick Manufacturing Company*.

Hereby enters this disclaimer to that part of the claims in said specification which is in the following words, to wit:

"8. A lubricating system comprising a receptacle for receiving lubricant, said receptacle tapering toward its outer end, a lubricant compressor having a rigid discharge conduit provided at its outer end with a coupling member rigidly secured thereto, comprising a guide nozzle for receiving said nipple, a gasket in said nozzle for contacting with said nipple, said nipple and gasket having communicating openings.

"9. A lubricating system comprising a receptable for receiving lubricant, said receptacle tapering toward its outer end, a lubricant compressor provided at one end with a coupling member, rigidly secured thereto, comprising a guide nozzle for loosely receiving said nipple, a gasket in said sleeve for contacting with said nipple, said nipple and gasket having communicating openings."

[*Official Gazette June 5, 1928.*]